M. KOPPE.
Insect-Destroyer.
No. 68,995.
Patented Sept. 17. 1867.
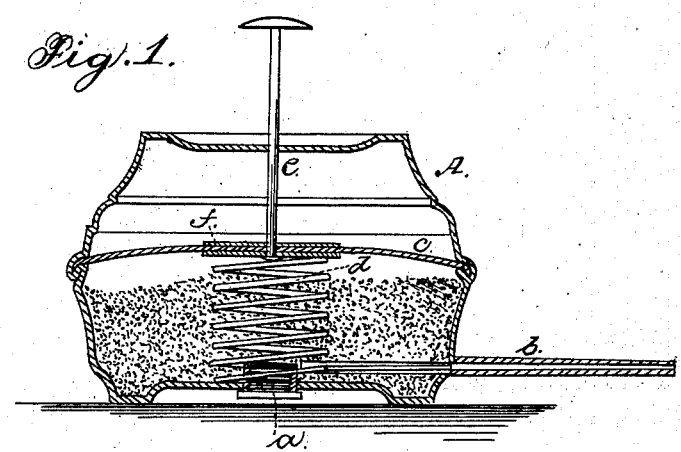
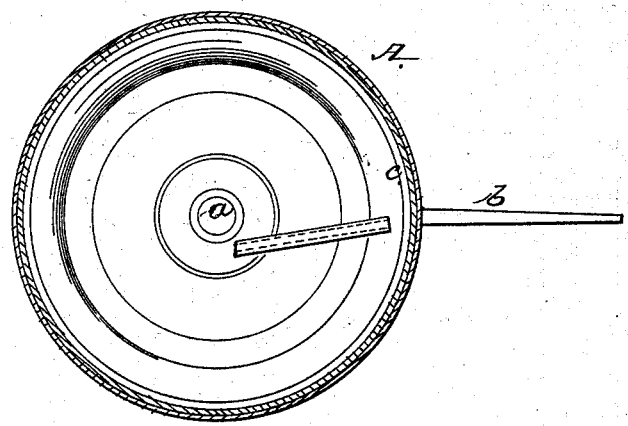
WITNESSES:
Gustav Berg
Hermann Gros
INVENTOR:
Moritz Koppe
Van Santvoord & Hauff
Attys

United States Patent Office.

MORITZ KOPPE, OF NEW YORK, N. Y.

Letters Patent No. 68,995, dated September 17, 1867.

---

IMPROVED INJECTOR FOR INSECT POWDER.

---

The Schedule referred to in these Letters Patent and making part of the same.

---

TO ALL WHOM IT MAY CONCERN:

Be it known that I, MORITZ KOPPE, of New York city, 219 Second street, in the county and State of New York, have invented a new and improved Injector for Insect Powder; and I hereby declare that the following is a full, clear, and exact description thereof, which will enable those skilled in the art to make and use the same, reference being had to the accompanying drawing, in which—

Figure 1 represents a vertical central section of this invention.

Figure 2 is a horizontal section of the same.

Similar letters indicate corresponding parts.

This invention consists in a vessel, the lower part of which forms the chamber intended to receive the insect powder. This chamber is covered up by an elastic diaphragm, which is subjected to the action of a spring, and to that of a thumb-piece or button, in such a manner that by depressing the thumb-piece the air in the powder-chamber is compressed, and a portion of the powder is forced out through a suitable spout, and on releasing the thumb-piece, the elastic diaphragm is forced back by the action of the spring to its original position, ready for a new operation.

A represents a vessel, made of sheet metal or any other suitable material, round, or in any other desirable form or shape. The lower part of this vessel forms the powder-chamber, which is filled with insect powder through a hole in its bottom or side, said hole being closed by a plug, $a$, or in any other suitable manner. From the powder-chamber extends a spout, $b$, which may be straight or curved, and of any desirable length. The powder-chamber is separated from the upper part of the vessel A by a diaphragm, $c$, which is made of India rubber or other suitable elastic material, and which is firmly secured to the inner circumference of the vessel A, either by clamping its edge between the sheet metal, as shown in fig. 1, or in any other suitable manner. Said diaphragm is subjected to the action of a spring, $d$, which has a tendency to force the same up, and to the action of a thumb-piece, $e$, whereby the diaphragm can be depressed. The thumb-piece extends up through the top of the vessel A, and it is secured to the diaphragm by means of two metal disks, $f$, as shown in the drawing, or in any other suitable manner.

By depressing the thumb-piece the air in the powder-chamber is compressed, and a portion of the powder is forced out through the spout $b$, and on releasing the thumb-piece the diaphragm is forced up by the spring $d$, and the air returns to the powder-chamber through the spout. By these means an injector for insect powder is obtained which is very convenient in its operation. It can be readily operated with one hand, and the jet of powder can be conveniently directed to any spot or corner where it may be wanted.

What I claim as new, and desire to secure by Letters Patent, is—

An injector for insect powder, composed of a vessel, A, with elastic diaphragm $c$, spout $b$, spring $d$, and thumb-piece $e$, substantially as and for the purposes set forth.

MORITZ KOPPE.

Witnesses:
W. HAUFF,
GUSTAV BERG.